United States Patent [19]
Dugas

[11] Patent Number: 5,984,334
[45] Date of Patent: Nov. 16, 1999

[54] AUTOMATIC BRAKING WHEELCHAIR

[76] Inventor: Grady A. Dugas, 37 Taylor St., Marion, La. 71260

[21] Appl. No.: 08/939,695

[22] Filed: Sep. 29, 1997

[51] Int. Cl.⁶ .............................. B62M 1/14; F16D 65/28; B60T 7/14
[52] U.S. Cl. .................................. 280/250.1; 280/304.1; 280/42; 280/642; 280/650; 297/DIG. 4; 188/109; 188/2 F; 188/31
[58] Field of Search .................................. 280/639, 642, 280/647, 649, 650, 47.38, 250.1, 304.1, 42; 188/109, 2 F, 31; 297/DIG. 4

[56] References Cited

U.S. PATENT DOCUMENTS

| | | | |
|---|---|---|---|
| 440,032 | 11/1890 | Herrington | 188/31 |
| 620,221 | 2/1899 | Breeze | 70/236 |
| 1,045,632 | 11/1912 | Suppes | 188/31 |
| 1,090,011 | 3/1914 | Ballinger | 188/109 |
| 1,206,419 | 11/1916 | Dahms | 188/17 |
| 1,495,819 | 5/1924 | Thomas | 188/17 |
| 1,646,971 | 10/1927 | Mendonca | 105/48 |
| 1,798,808 | 3/1931 | Potter | 188/31 |
| 1,844,818 | 2/1932 | Gattie | 188/109 |
| 2,053,852 | 9/1936 | Tracy | 188/109 |
| 2,259,924 | 10/1941 | Connolly | 188/109 |
| 3,174,768 | 3/1965 | Sanders et al. | 280/33.994 |
| 3,302,757 | 2/1967 | Eagleson, Jr. et al. | 188/167 |
| 3,356,185 | 12/1967 | Isaacks | 188/31 |
| 3,529,700 | 9/1970 | Marshall | 188/109 |
| 4,320,818 | 3/1982 | Knoche | 188/2 F |
| 4,384,713 | 5/1983 | Deutsch | 272/70.3 |
| 4,555,121 | 11/1985 | Lockard | 280/30 |
| 4,623,043 | 11/1986 | Babilas | 188/2 F |
| 4,733,755 | 3/1988 | Manning | 188/2 F |
| 4,852,697 | 8/1989 | Kulik | 188/2 F |
| 5,203,433 | 4/1993 | Dugas | 188/2 F |
| 5,799,756 | 9/1998 | Roberts | 188/2 F |

FOREIGN PATENT DOCUMENTS

| | | | |
|---|---|---|---|
| 693792 | 4/1930 | France | 188/109 |

*Primary Examiner*—J. J. Swann
*Assistant Examiner*—Andrew J. Ririe
*Attorney, Agent, or Firm*—David L. Ray

[57] ABSTRACT

An automatic braking wheelchair having an automatic braking assembly which automatically locks one or both wheels of a wheelchair when the patient attempts to rise. The automatic braking assembly includes a movable seat on which a patient sits, a support assembly for supporting the movable seat, the support assembly having two axles connected thereto, each of the axles having a rotatable hub connected thereto, each of the hubs having a drive wheel rigidly connected thereto, the movable seat being slidably connected to the support assembly, at least one spring connected to the support assembly and to the movable seat for moving the movable seat upward when the patient is not sitting in the movable seat, a locking gear rigidly connected to each of the two hubs, the locking gear having a plurality of teeth thereon, a locking gear receiver rigidly connected to the movable seat, the locking gear receiver having a cavity therein for receipt of the teeth of the locking gear to selectively lock the hub and said drive wheel in a stationary position.

5 Claims, 7 Drawing Sheets

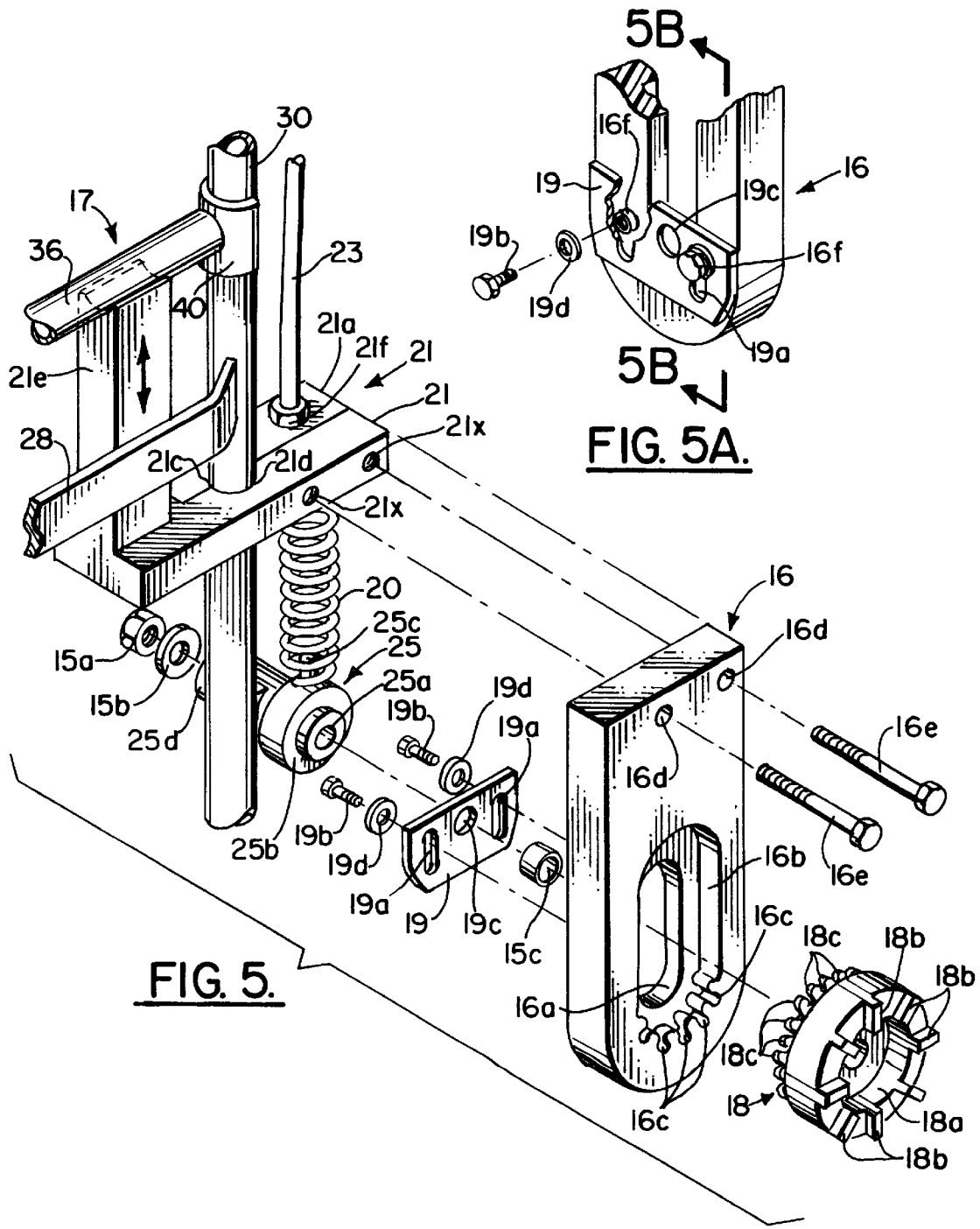

AUTOMATIC BRAKING WHEELCHAIR

BACKGROUND OF THE INVENTION

1. Field of the Invention

The present invention is related to wheelchairs. In particular, the present invention is related to braking devices for wheelchairs. More particularly, the present invention is related to braking devices which are actuated when a patient rises from the wheelchair.

2. Description of the Related Art

Getting in and out of a wheelchair is a dangerous task for patients. Physically and mentally disabled people are injured when they attempt to get out of, and especially into, the wheelchair without an attendant or nurse to assist them because the wheelchair rolls away from them as they attempt to rise from the wheelchair.

Injuries suffered by patients exiting wheelchairs are particularly prevalent among the mentally impaired. A mentally impaired patient told by a nurse to stay in the wheelchair until an attendant is summoned may forget the nurse's warning shortly after the nurse leaves the patient. Such occurrences commonly occur in homes for the elderly where there are many patients suffering from Alzheimer's disease and other mental frailties.

Braking assemblies for wheelchairs are known in the art. Exemplary of the braking assemblies of the prior art are those disclosed in the following U.S. Patents:

U.S. Pat. No. 4,623,043 discloses an automatic wheelchair brake which automatically locks both wheels when a patient attempts to rise from the wheelchair. While seated the patient manually operates a three-way lever brake with manually locked, manually unlocked and automatic positions. If the patient attempts to rise while the brake lever is in the manually unlocked position, the lever automatically returns to the automatic position and both wheels still lock automatically. After the patient has exited, the wheelchair may easily be moved by shifting the operating lever to the manual unlock position.

U.S. Pat. No. 4,320,818 discloses a wheelchair brake assembly for use with a conventional foldable wheelchair which provides a pair of rearwardly extending brake arms connected to adjacent side frames underneath the seat. Each brake arm includes a transverse forward portion pivoted to the side frame and having a brake shoe biased into engagement with a drive wheel. The rearward portion of each brake arm is provided with a post engageable by the wheelchair seat to pivot the brake shoe out of engagement with the wheel when the seat is depressed and moved downwardly by the weight of an occupant. The wheelchair side frames are connected by a tension spring to ensure that the brake is engaged when the wheelchair is unoccupied.

U.S. Pat. No. 3,529,700 discloses a brake assembly for wheelchairs including spring loaded brake elements mounted on the main frame of a wheelchair and biased toward wheel engagement. The elements are disengaged from the wheels in response to a seat controlled linkage or manually operable disengagement device.

U.S. Pat. No. 3,302,757 discloses an automatic immobilizing device in a wheelchair having a frame and a chair supported by at least two wheels rotatably mounted to either side of the chair, the improvement including two elongated lever members each pivotally mounted at one end to the frame, each lever member being substantially horizontally positioned, one each of the lever members being positioned adjacent one each of the wheels and each being disposed to engage and immobilize the adjacent wheel when urged pivotally downwardly; a spring assembly operatively connected to and disposed to urge each lever pivotally downwardly into engagement with the wheels; and a belt attached at either end to one of the levers, being suspended from the frame and extending across the levers from engaging and immobilizing the wheels when sat upon by a person and of such length that the spring urges the levers into engagement with the wheels when a person rises from the belt.

U.S. Pat. No. 2,259,924 discloses a braking device for invalid chairs having forward and rearward supporting wheels, a seat section movable about an approximately horizontal axis located between the forward and rearward wheels; at least one leg carried by the seat section forward of the axis, and a braking device for one or more of the rearward wheels connected with the seat section; the seat section being movable about the axis under control of an occupant of the chair to thereby shift both the leg and the braking device from an active position to an inactive position and vice versa.

U.S. Pat. No. 2,053,852 discloses a mechanical chair which is a combination of a frame; a seat pivoted adjacent its forward edge to the frame; a rotatable member having bearings in the frame and connected by an operating rod to the seat to raise and lower the latter about its pivot; a motor operatively connected to and rotating the member; a stopping device carried by the member operative to stop the actuation of the motor when the seat is in its extreme raised and lowered positions; and a manually operated actuation device for initiating actuation of the motor after it has been stopped.

My U.S. Pat. No. 5,203,433 discloses an automatic braking wheelchair having an automatic braking assembly which automatically locks one or both wheels of a wheelchair when the patient attempts to rise.

SUMMARY OF THE INVENTION

In accordance with the present invention there is provided an automatic braking wheelchair having an automatic braking assembly which automatically locks one or both wheels of a wheelchair when the patient attempts to rise. The automatic braking assembly includes a movable seat on which a patient sits, a support assembly for supporting the movable seat, the support assembly having two axles connected thereto, each of the axles having a rotatable hub connected thereto, each of the hubs having a drive wheel rigidly connected thereto, the movable seat being slidably connected to the support assembly, at least one spring connected to the support assembly and to the movable seat for moving the movable seat upward when the patient is not sitting in the movable seat, a locking gear rigidly connected to each of the two hubs, the locking gear having a plurality of teeth thereon, a locking gear receiver rigidly connected to the movable seat, the locking gear receiver having a cavity therein for receipt of the teeth of the locking gear to selectively lock the hub and said drive wheel in a stationary position.

The automatic braking assembly of the invention has the advantage of providing a simple and effective low cost automatic braking system for wheelchairs.

Furthermore, the automatic braking system of the invention has the advantage of being easily and economically retrofitted to existing wheelchairs to provide automatic braking and prevent further patient injury.

In addition, the automatic braking system of the invention provides a positive mechanical lock for the wheels of the wheelchair rather than a frictional lock which contacts the rubber rim of the wheel.

BRIEF DESCRIPTION OF THE DRAWINGS

FIG. 5 is an exploded, enlarged, perspective, partly cut-away view of the braking assembly of the invention;

FIG. 5A is a partly cut-away detailed view of the locking bracket of the braking assembly of the invention;

DESCRIPTION OF THE PREFERRED EMBODIMENTS

Figure 1:
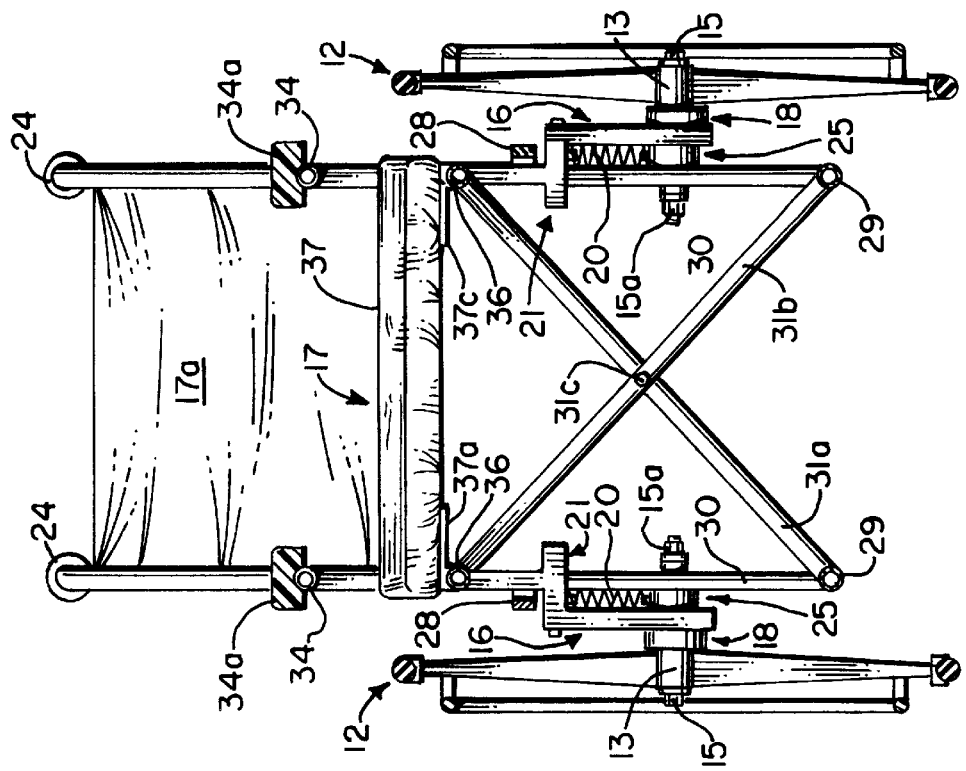
FIG. 1 is a partly cut-away, side elevational view of an automatic braking wheelchair employing the braking assembly of the present invention.

Referring now to the drawings, FIG. 1 illustrates the application of the automatic wheelchair braking assembly of the invention to a wheelchair generally indicated by the numeral 10. Wheelchair 10 is conventional wheelchair such as that shown in FIG. 1 through FIG. 3 of U.S. Pat. No. 4,320,818 which is hereby incorporated by reference.

As can be seen in FIG. 1, wheelchair 10 has two large rear drive wheels which can be turned manually by the patient generally indicated by the numeral 12, and wheelchair 10 has two small front wheels generally indicated by the numeral 14. Wheels 12 have a plurality of spokes 12a connected to hub 13. As can best be seen in FIG. 6, hub 13 has a central cylindrical bore 13a having a bearing and race 13b therein for receipt of axle 15. As can best be seen in FIGS. 2 and 6, hub 13 rotates about axle 15 and is held onto axle 15 by nut 15a.

Figure 2:
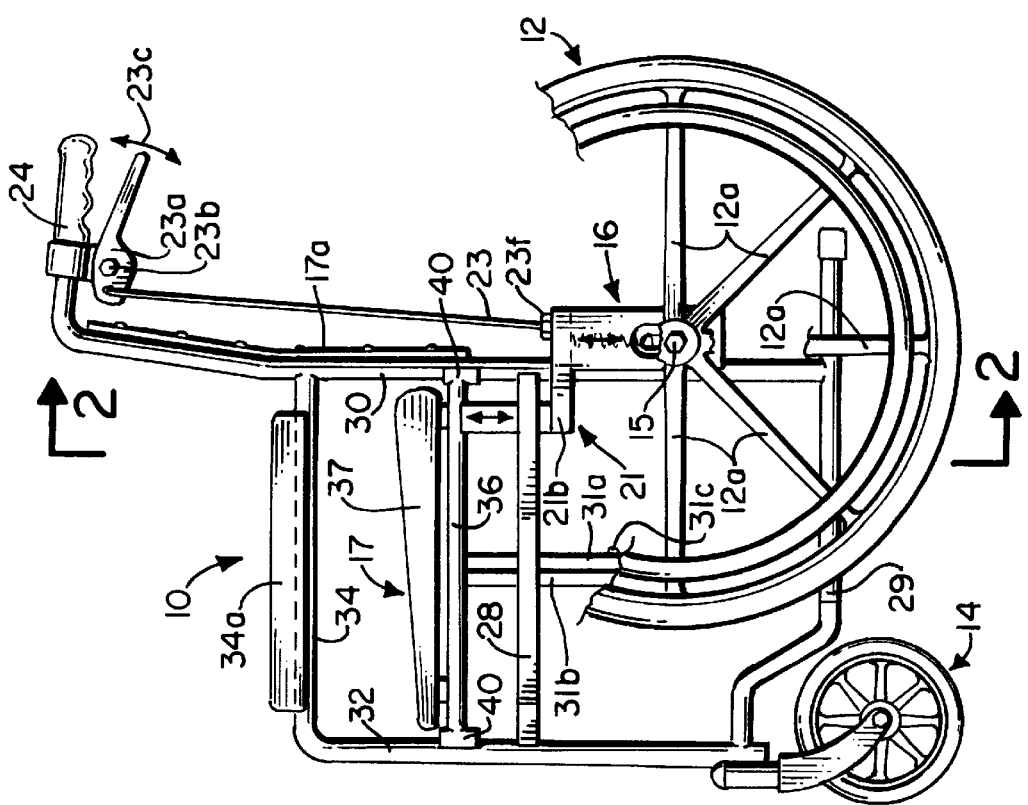
FIG. 2 is a cross-sectional view of the automatic braking wheelchair of FIG. 1 taken along lines 2—2 of FIG. 1.
Figure 4:
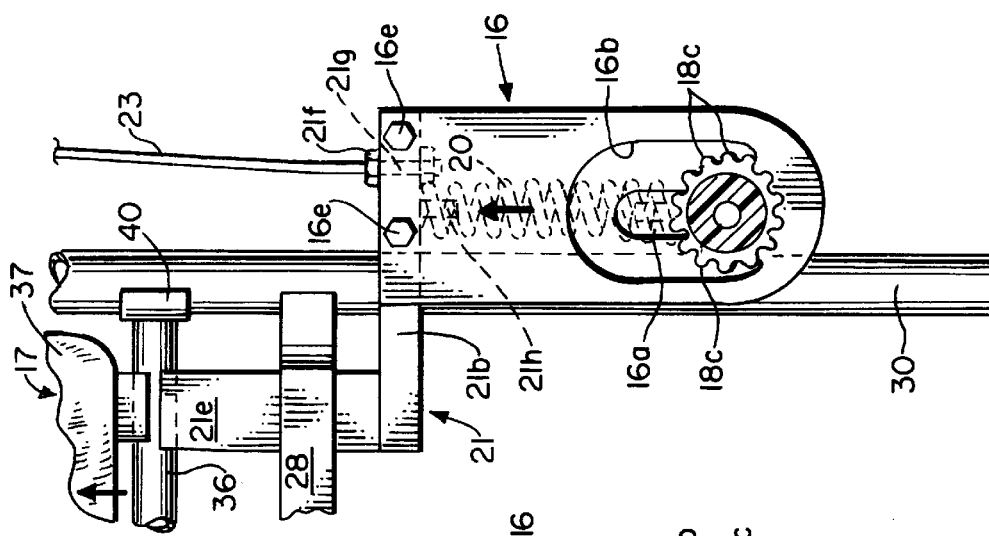
FIG. 4 is an enlarged, partly cut-away, perspective view of a portion of the wheelchair and automatic braking assembly of the present invention when the seat of the wheel chair is has traveled upward to lock the automatic braking assembly.
Figure 3:
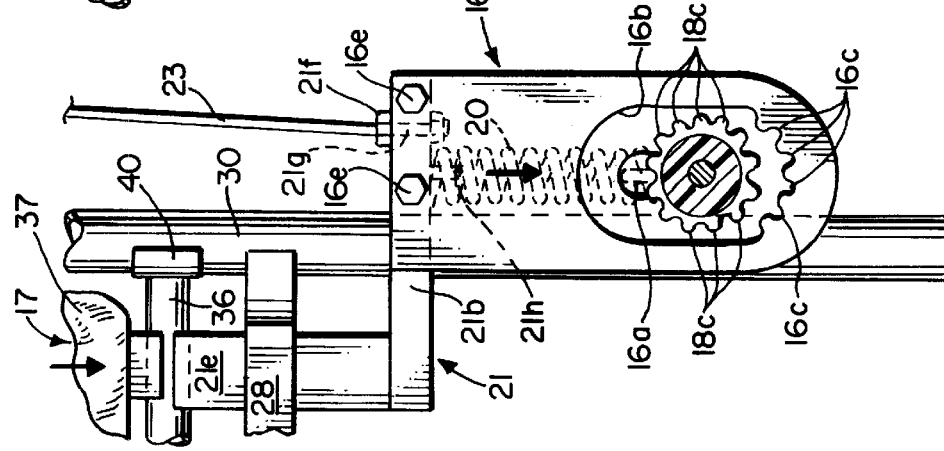
FIG. 3 is an enlarged, partly cut-away, perspective view of a portion of the wheelchair and automatic braking assembly of the present invention when the seat of the wheel chair has traveled downward to unlock the automatic braking assembly.

As can best be seen in FIGS. 3, 4, and 5, the automatic wheelchair braking assembly of the invention includes a locking bracket generally indicated by the numeral 16 which is connected by bolts 16e—16e which are fitted in cylindrical holes 16d—16d to the sliding support block generally indicated by the numeral 21. Sliding support block 21 moves upward and downward with movable seat assembly 17. Locking bracket 16 moves upward and downward with movable seat assembly 17 to engage and disengage the teeth 18c of the locking gear generally indicated by the numeral 18 shown in FIGS. 2, 5, 6, 8 and 11.

As can best be seen in FIG. 5, locking bracket 16 is preferably an elongated rigid reinforced plastic or metal bracket having a first elongated cavity 16a therein for receipt of axle 15, and a second elongated cavity 16b for receipt of axle 15 and teeth 18c of locking gear 18. First cavity 16a is generally rectangular in shape and is smaller in width and height than second cavity 16b. Second cavity 16b is generally rectangular in shape and has a plurality of slots 16c aligned in the bottom thereof for receiving and locking teeth 18c into slots 16c when teeth 18c are received in slots 16c. A spacer sleeve 15c fits around axle 15 and inside of cavities 16a and 16b which is equal in length to the thickness of cavity 16a.

Figure 5B:
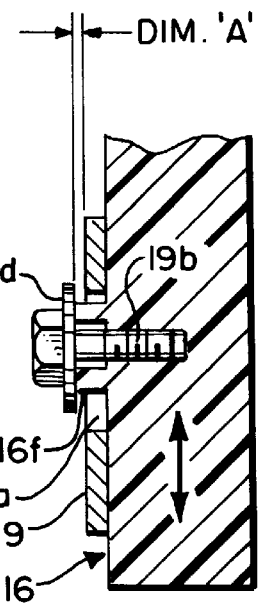
FIG. 5B is a partly cut-away, cross-sectional view taken along lines 5B—5B of FIG. 5A.

Preferably, when locking bracket 16 is made from reinforced plastic and needs additional strength, a rigid metal band 19, which can best be seen in FIGS. 5 and 5A, may be attached to the lower end of locking bracket 16. Band 19 has two oblong slots 19a therein for receipt of screws 19b. Band 19 also has a circular hole 19c therein for receipt of axle 15. When band 19 is utilized in conjunction with locking bracket 16, preferably two internally threaded bosses 16f—16f are formed on the inside of locking bracket 16 as shown in FIGS. 5A and 5B for receipt of screws 19b having washers 19d thereon. As shown in FIG. 5B, the two bosses 16f—16f extend outward from locking bracket 16 a distance equal to DIM. 'A', which is a distance sufficient to prevent washers 19d from striking band 19 so that locking bracket 16 can move upward and downward on bosses 16f—16f.

Figure 6:
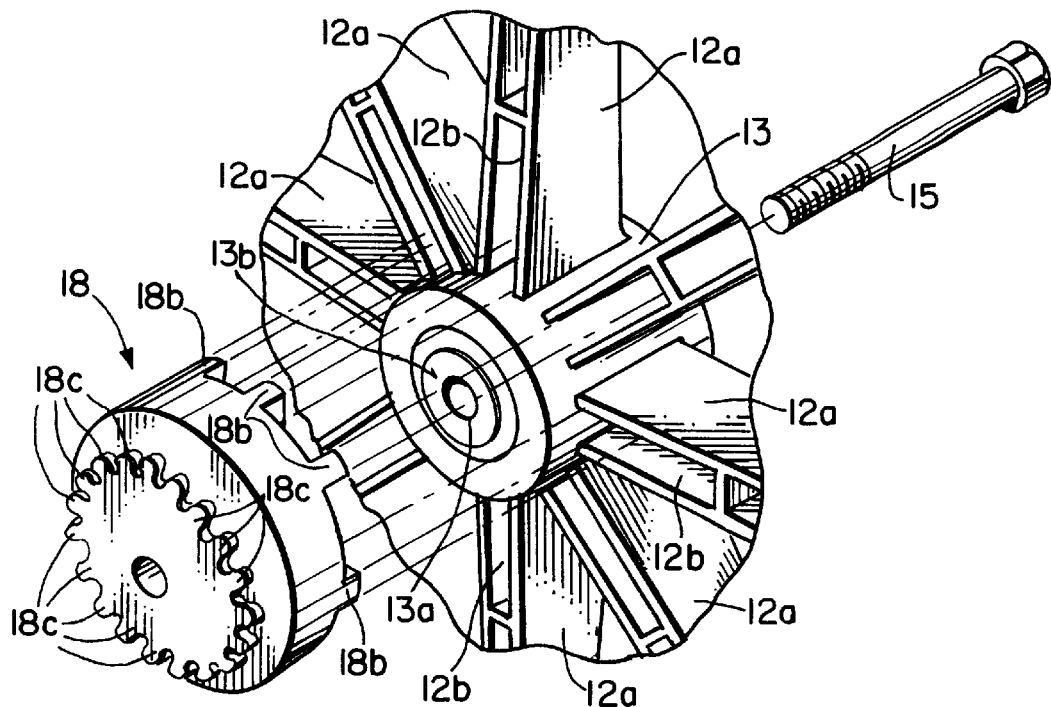
FIG. 6 is an exploded, enlarged, perspective, partly cut-away view of a wheel and locking hub of the automatic braking system of the present invention.

As can best be seen in FIGS. 5 and 6, locking gear 18 is generally cylindrical in shape and has a hollow cylindrical cavity 18a therein which snugly receives hub 13. Locking member 18 has a plurality of protuberances 18b extending axially out of the outside end thereof, each of which protuberances engage and are received in cavities 12b formed in spokes 12a of wheel 12, as shown in FIG. 6, to secure locking gear 18 to wheel 12. Locking gear 18 has a plurality of teeth 18b arranged in a circle at the other end thereof which are aligned perpendicularly to the longitudinal central axis of locking gear 18. Locking gear 18 has a central cylindrical bore 18d therein for receipt of axle 15.

Wheelchair 10 has a horizontal support member 28 to which the wheelchair flexible seat would have been attached on a conventional wheelchair. Upper horizontal support members 28—28 rigidly connect vertical members 30 and 32 of wheelchair 10 immediately below movable seat assembly 17. Lower horizontal support members 29—29 rigidly connect the lower ends of vertical support members 30 and 32. A flexible back rest 17a supports the back of the person who sits on seat assembly 17.

Figure 8:
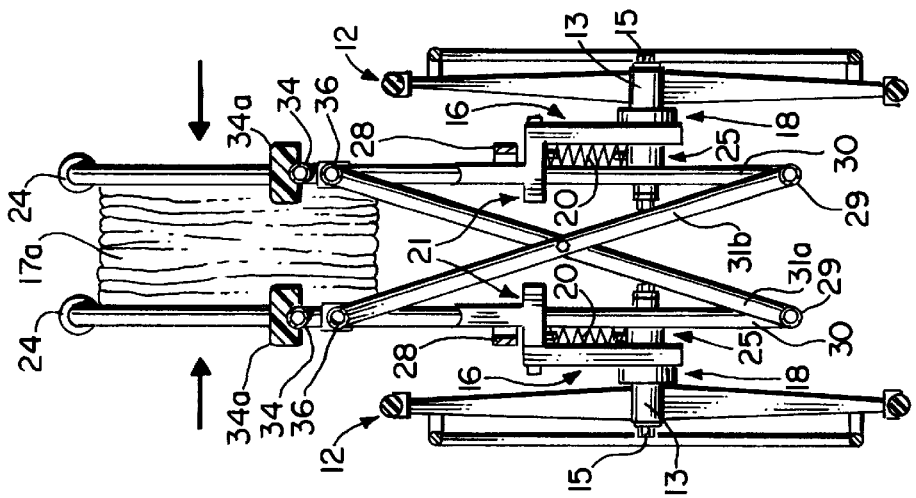
FIG. 8 is the wheelchair shown in FIG. 2 with the seat removed and the two wheels forced toward each other for storage of the wheelchair.

As best shown in FIG. 2, two cross-bars 31a and 31b are pivotally connected at their mid-point by pin 31c. Each cross-bar 31a and 31b is rotatably connected at one end to lower horizontal support member 29 and at the other end to horizontal seat support member 36 enabling the wheelchair 10 to be folded compactly as shown in FIG. 8 for storage.

Arm rest support member 34 also connects each vertical support member 32 to each vertical support member 30. Arm rest 34a is connected to each arm rest support member 34.

Figure 11:
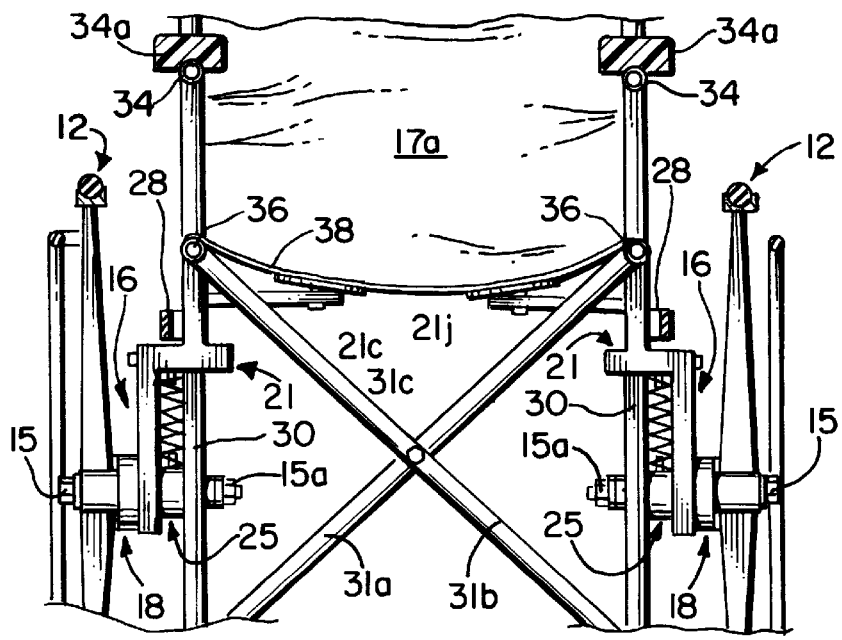
FIG. 11 is a partly cut-away, partly cross-sectional, front elevational view of a third embodiment of the invention wherein a flexible seat is utilized.
Figure 13:
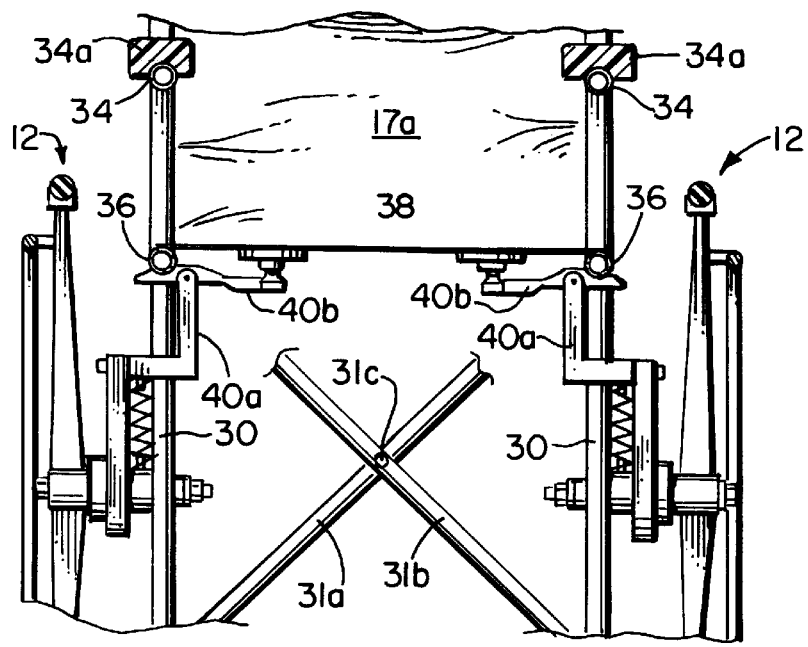
FIG. 13 is a partly cut-away, partly cross-sectional, front elevational view of a fourth embodiment of the invention wherein a flexible seat is utilized.

Movable seat assembly 17 includes two horizontal seat support members 36 on each side thereof having rigid seat 37 shown in FIGS. 1–4, 7 and 7A, or flexible seat 38 shown in FIGS. 11 and 13 connected therebetween. At each end of horizontal seat support members 36 are semi-cylindrical guides 40 which extend approximately half-way around and slide upward and downward on vertical support members 30 and 32.

Figure 7:
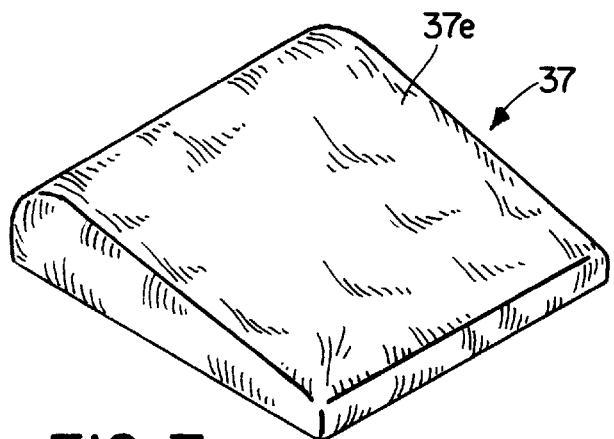
FIG. 7 is a perspective view of the top of a seat of the invention.
Figure 7A:
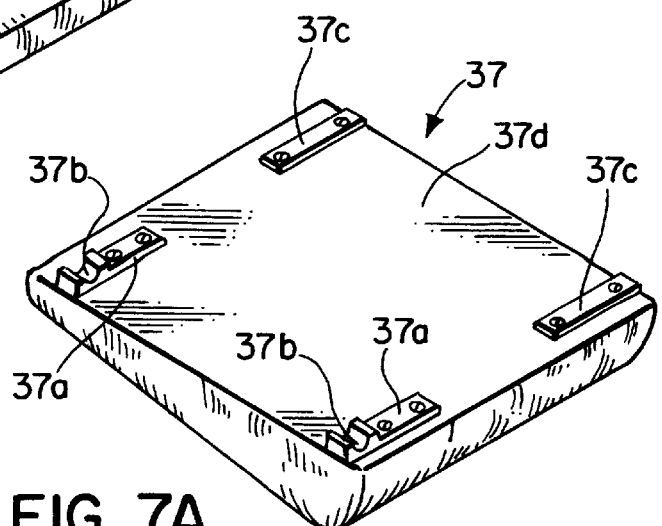
FIG. 7A is a perspective view of the bottom of the seat shown in FIG. 7.

A perspective view of the top of rigid seat 37 is shown in FIG. 7, and a perspective view of the bottom of rigid seat 37 is shown in FIG. 7A. The bottom 37d of seat 37 is a rigid rectangular plate made from a rigid material such as metal or plastic. The upper portion 37e of seat 37 is made from a soft, resilient material such as foam rubber or the like. On the bottom edge of seat 37 are connected two bracket members 37a—37a, each having a semi-circular bracket 37b therein which rest on one of the two horizontal seat support members 36—36 as shown in FIG. 2. On the opposite edge of the bottom of rigid seat 37 are two rectangular bearing plates 37c—37c which rest on the other of the two horizontal seat support members 36—36 as shown in FIG. 2.

Each of the two sliding support blocks 21—21 has two generally rectangular sections 21a and 21b which are rigidly connected together by screwing, bolting, gluing or the like. Each rectangular section has a semi-circular cylindrical channel 21c and 21d therein for placement around each of the two vertical members 30—30. Extending upward from each of the two generally rectangular sections 21a—21a is rigid contact member 21e which is forced into contact with horizontal seat support 36 by spring 20. Extending downward from rectangular section 21b is a pin 21h which is located on the inside of spring 20 to position spring 20 thereon. Each of the two rectangular sections 21b has two threaded cylindrical holes 21x—21x formed therein into which bolts 16e—16e can be threaded.

Preferably, as best shown in FIG. 1, a vertical release rod 23 is placed into a cylindrical bore 21g in each rectangular section 21a—21a and held in the desired position by lock nut 21f. Each of the two vertical release rods 23—23 extends upward to a lever 23a which is pivotally connected to handle 24 by pin 23b. Lever 23a can be moved in the directions indicated by the arrow 23c. When lever 23a is moved upward toward handle 24 by grasping with the hand of the operator, locking bracket 16 is forced downward as shown in FIG. 3, thereby unlocking the wheels and enabling the wheel chair to be rolled from one location to another when no person is sitting therein.

A generally cylindrical axle housing generally indicated by the numeral 25 as can best be seen in FIG. 5 is rigidly connected to each of the vertical support members 30—30 by welding or the like. Axle housing 25 has a central cylindrical bore 25a therein for receipt of axle 15. Axle housing has an enlarged cylindrical portion 25b having a pin 25c thereon which is received inside of spring 20 and which holds spring 20 thereon. Rigidly connected to enlarged cylindrical portion 25b is a cylindrical section 25d which is rigidly connected to each of the support members 30—30 by welding or the like. Axle 15 is received in bore 25a and connected to axle housing 25 by washer 15b and nut 15a.

When a person rises from the seat assembly 17 of the wheelchair 10 of the invention, locking bracket 16 and slots 16c are forced upward as indicated by the arrows in FIG. 4 by spring 20 toward teeth 18c from the position shown in FIG. 3 and into contact with teeth 18c as shown in FIG. 4 to secure locking gear 18 to locking bracket 16 and thereby lock hub 13 and wheel 12 in a stationary position. When a person sits on the seat 17 of the wheelchair 10 of the invention, locking bracket 16 moves downward as indicated by the arrows in FIG. 3, and slots 16c are moved downward to prevent engagement with teeth 18c, and teeth 18c are free to rotate in second cavity 16b.

Thus, in the position shown in FIG. 4, no one is sitting in wheelchair 10, and slots 16c of locking bracket 16 have engaged locking gear 18 to lock the wheel 12 of wheelchair 10. In the position shown in FIG. 3 with the patient being seated in wheelchair 10, seat 17 and locking bracket 16 move downward as indicated by the arrows, thereby disengaging teeth 18c from slots 16c and enabling wheel 12 to roll freely.

Figure 9:
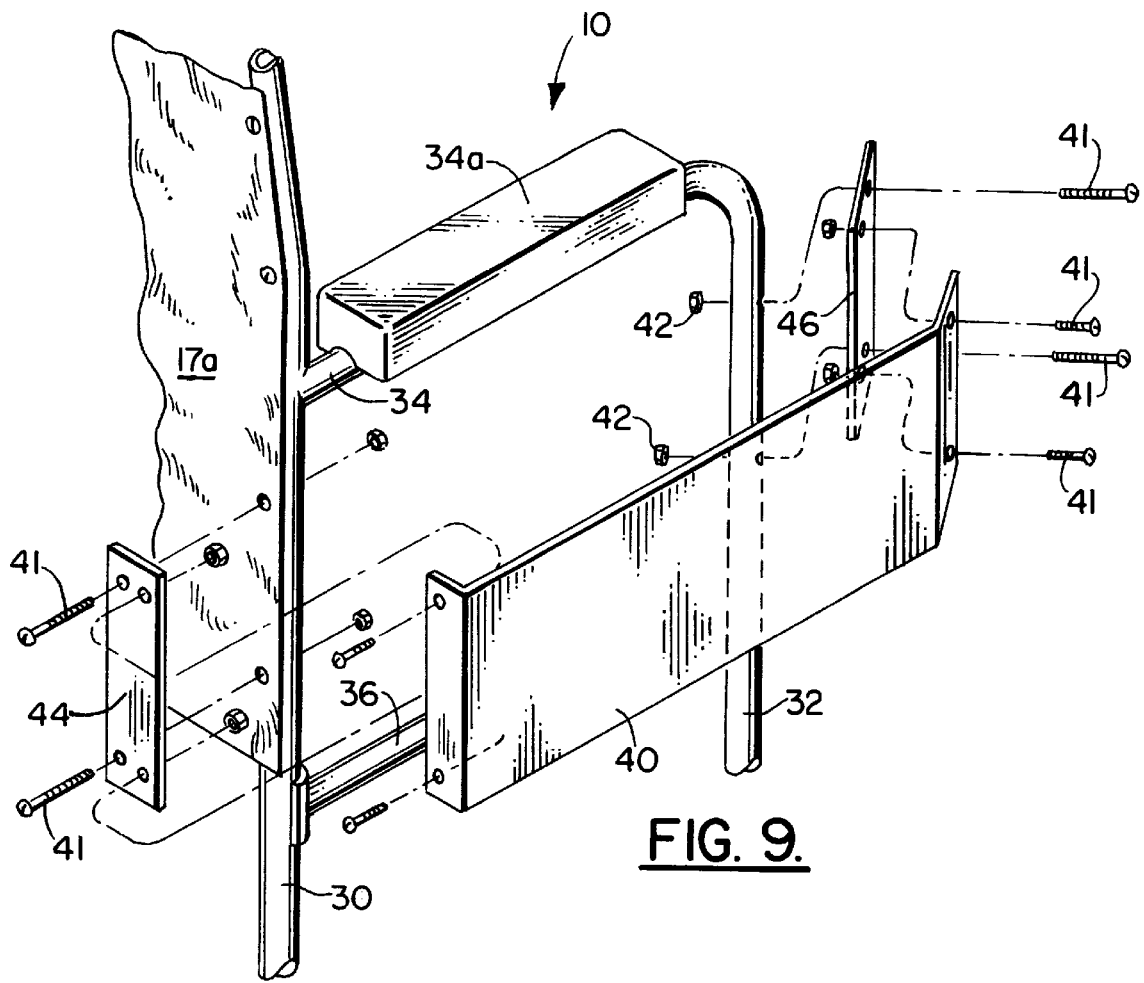
FIG. 9 is a partly cut-away, perspective view of a second embodiment of the invention having a side plate adjacent to the seat.
Figure 10:
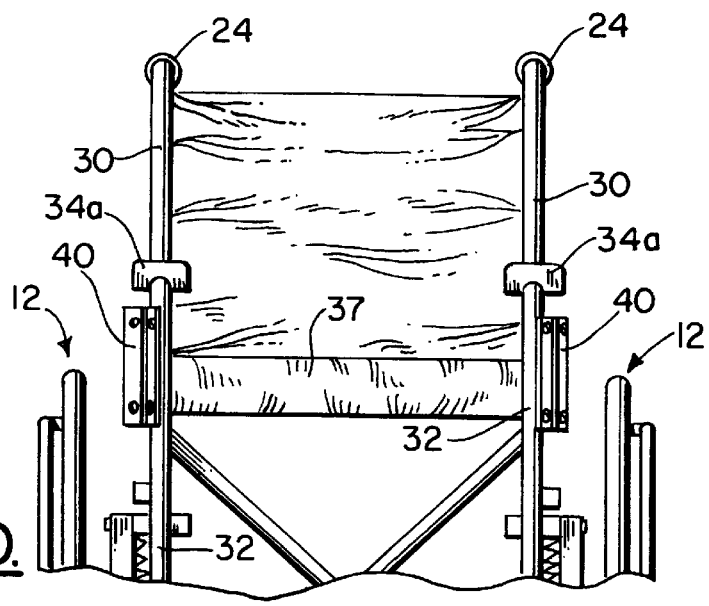
FIG. 10 is a partly cut-away, front elevational view of the embodiment of FIG. 9.

In the second embodiment of the invention shown in FIGS. 9 and 10, two generally rectangular side plates 40—40 are bolted to the vertical support members 30 and 32 by bolts 41 and nuts 42 of the wheelchair 10 utilizing rigid seat 37 to contain the garments the patient may be wearing and prevent them from becoming entangled in the wheels 12—12. Two additional rectangular plates 44 and 46 may first be bolted to vertical support members 30 and 32 and then side plates 40—40 may be bolted thereto as shown in FIGS. 9 and 10.

Figure 12:
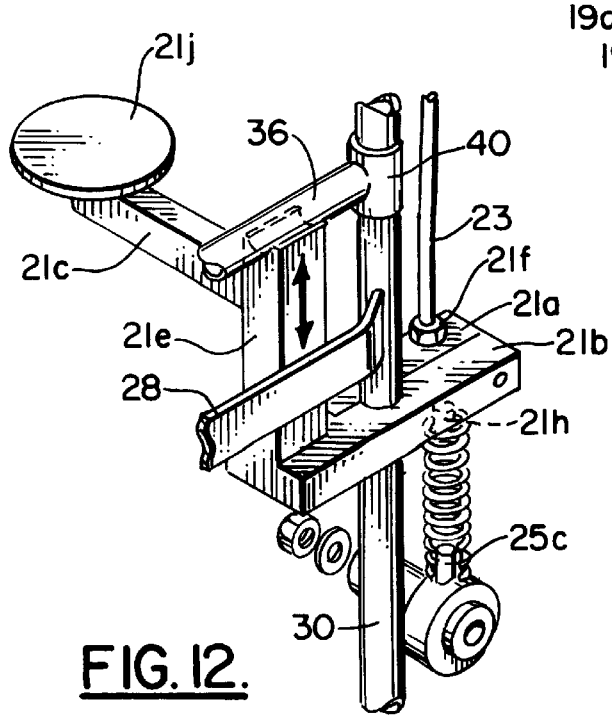
FIG. 12 is an enlarged, perspective, partly cut-away view of the flexible seat support assembly of the third embodiment of the invention.

In FIG. 11 is shown a third embodiment of the wheelchair 10 of the invention wherein a flexible seat 38 is utilized rather than the rigid seat 37. The components of the wheelchair 10 shown in FIGS. 11 and 12 are the same as those explained above with the exception that seat support arm 21i is rigidly connected to rigid contact member 21e. Seat support arm 21i has a plate 21j connected at the end thereof to support the buttocks of the patient sitting on seat 38 to provide greater comfort to the patient and to exert a vertical downward force on sliding support block 21 when the patient sits on seat 38 to facilitate easy engagement and disengagement of teeth 18c with slots 16c.

Figure 14:
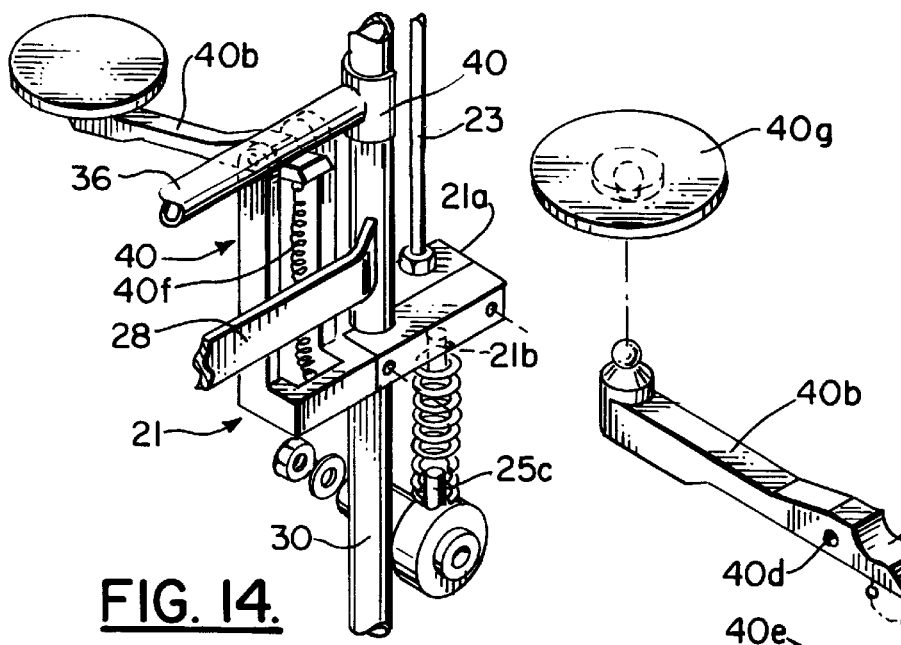
FIG. 14 is an enlarged, perspective, partly cut-away view of the flexible seat support assembly of the fourth embodiment of the invention.
Figure 14A:
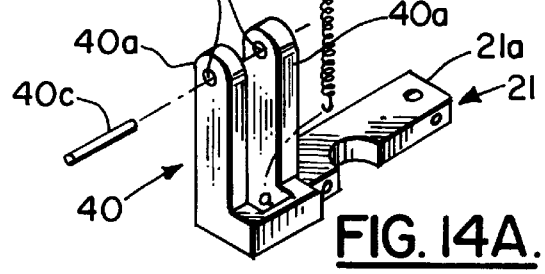
FIG. 14A is an enlarged, perspective, exploded, partly cut-away view of a portion of the flexible seat support assembly of the fourth embodiment of the invention.

In FIGS. 14 and 14A is shown a fourth embodiment of the invention wherein a flexible seat 38 is utilized rather than the 1i rigid seat 37. The components of the wheelchair 10 shown in FIGS. 14 and 14A are the same as those explained above with the exception that seat support arm assembly generally indicated by the numeral 40 is rigidly connected to rectangular section 21a and replaces rigid contact member 21e. Seat support arm assembly 40 includes two vertical, spaced apart, parallel arms 40a—40a which rotatably support a seat support arm 40b and are rigidly connected to rectangular section 21a. Seat support arm 40b is rotatably connected to parallel arms 40a—40a by pin 40c which is received in cavity 40d of seat support arm 40b and in cavities 40e—40e of parallel arms 40a—40a. Seat support arm 40b has a concave portion 40h on one end thereof which rests against seat support 36. A spring 40f is connected to arm 40b adjacent to concave portion 40e and the base of parallel arms 40a—40a to bias plate 40g upward. Plate 40g is connected at the other end of seat support arm 40b to support the buttocks of the patient sitting on seat 38 to provide greater comfort to the patient and to exert a vertical downward force on sliding support block 21 when the patient sits on seat 38 to facilitate easy engagement and disengagement of teeth 18c with slots 16c.

From the above it can be seen that the automatic braking assembly of the present invention can be easily fitted to existing, conventional wheelchairs in widespread use. The braking assembly can be connected to one or both of the two drive wheels 12, although it is preferred that the braking assembly is connected to both drive wheels. If desired, conventional supplemental braking devices well known in the art may be used in addition to the automatic braking assembly of the invention such as an additional brake that can be set to prevent the wheelchair from rolling even when occupied. Furthermore, the automatic braking assembly of the present invention can be incorporated into the construction of new wheelchairs.

Although the preferred embodiments of the invention have been described in detail above, it should be understood that the invention is in no sense limited thereby, and its scope is to be determined by that of the following claims:

What is claimed is:

1. An automatic braking wheelchair which is automatically prevented from rolling when a patient attempts to rise from the wheelchair, the wheelchair having two large drive wheels, each of said drive wheels of said wheelchair having spokes connected to a hub which rotates about an axle, said automatic braking wheelchair comprising:

a. a movable seat on which a patient sits,
   b. a support assembly for supporting said movable seat, said support assembly having two forward vertical members and two rearward vertical members, said seat being adapted to move downward along said two forward vertical members and said two rearward vertical members when a patient sits thereon, said seat being adapted to move upwardly along said two forward vertical members and said two rearward vertical members when a patient rises therefrom, said two rearward vertical members of said support assembly having two axles connected thereto, each of said axles having a rotatable hub connected thereto, each of said hubs having one of said two large drive wheel rigidly connected thereto, said movable seat being slidably connected to said support assembly,
   c. at least one spring connected to said support assembly and to said movable seat for moving said movable seat upward when the patient is not sitting in said movable seat,
   d. a circular locking gear rigidly connected to each of said two hubs, said locking gear having a plurality of teeth thereon,
   e. a sliding support block rigidly connected to each of the two sides of said movable seat for movement upward and downward with said seat, said support block having a semi-circular channel therethrough for sliding receipt of one of said rearward vertical members,
   f. a locking gear receiver rigidly connected to each of said sliding support blocks, each of said locking gear receivers having a first cavity therein for receiving one of said two axles and a second cavity therein adjacent to said first cavity with a plurality of slots arranged in an upward facing semi-circle for receipt of said teeth of one of said circular locking gears as said gear moves downward when said seat moves downward to selectively lock each of said hubs and said drive wheels in a stationary position, and
   g. a hand operated release connected to said sliding support block to force said sliding support block downward to remove said circular locking gear from said locking gear receiver to enable said wheelchair to be rolled when a patient has left said wheelchair.

2. The automatic braking wheelchair of claim 1 wherein said two axles are connected to said two rearward vertical members of said support assembly by a generally cylindrical axle housing rigidly connected to each of said two rearward vertical members beneath said sliding support blocks.

3. The automatic braking wheelchair of claim 2 wherein said spring is connected to said generally cylindrical axle housing and to said sliding support block.

4. The automatic braking wheelchair of claim 3 wherein each of said circular locking gears has a hollow cylindrical cavity therein for receipt of said hub.

5. The automatic braking wheelchair of claim 4 wherein said hub has a plurality of protuberances thereon which are received in hollow cavities formed in said spokes of said drive wheels.

* * * * *